US008891400B2

(12) United States Patent  
Martin et al.

(10) Patent No.: US 8,891,400 B2  
(45) Date of Patent: Nov. 18, 2014

(54) MEASUREMENT REPORTING

(71) Applicant: Broadcom Corporation, Irvine, CA (US)

(72) Inventors: Brian Alexander Martin, Farnham (GB); Keiichi Kubota, Weybridge (GB)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/149,400

(22) Filed: Jan. 7, 2014

(65) Prior Publication Data

US 2014/0119227 A1 May 1, 2014

Related U.S. Application Data

(63) Continuation of application No. 13/849,988, filed on Mar. 25, 2013.

(30) Foreign Application Priority Data

May 11, 2012 (GB) .................................. 1208469.5

(51) Int. Cl.
| | |
|---|---|
| H04L 12/26 | (2006.01) |
| H04W 24/10 | (2009.01) |
| H04W 24/02 | (2009.01) |
| H04W 36/00 | (2009.01) |
| H04L 5/00 | (2006.01) |

(52) U.S. Cl.  
CPC .............. H04W 24/10 (2013.01); H04W 24/02 (2013.01); H04W 36/0061 (2013.01); H04L 5/0053 (2013.01)  
USPC ........................................................ 370/252

(58) Field of Classification Search  
USPC .................................. 370/208, 216, 252, 254  
See application file for complete search history.

(56) References Cited

U.S. PATENT DOCUMENTS

| 6,175,734 B1 * | 1/2001 | Desgagne et al. ............. 455/437 |
| 2006/0141999 A1 * | 6/2006 | Funnell et al. ................ 455/423 |
| 2012/0057554 A1 * | 3/2012 | Xu et al. ....................... 370/329 |

OTHER PUBLICATIONS

Hiltunen, K, et al., "Comparison Between the Periodic and Event-Triggered Intra-Frequency Handover Measurement Reporting in WCDMA," Wireless Communications and Networking Conference, 2000, IEEE, vol. 2, Ericsson Radio Systems AB et al., pp. 471-475 (5 pages).

Nokia, "4C-HSDPA measurements open issues," 3GPP TSC-RAN WG4 #57, Jacksonville, USA, Nov. 15-19, 2010, R4-104317, (6 pages).

Ericsson et al., "Procedural text to support measurements in the Secondary UL Frequency," 3GPP TSC-RAN WG2 #72, Jacksonville, USA, Nov. 15-19, 2010, R2-106733, (46 pages).

UKIPO Combined Search and Examination Report under Sections 1.7 and 18(3) dated Sep. 7, 2012 which is issued in a related UK Application No. GB1208469.5 (7 page).

* cited by examiner

Primary Examiner — Hassan Kizou  
Assistant Examiner — Abdullahi Ahmed  
(74) Attorney, Agent, or Firm — Foley & Lardner LLP

(57) ABSTRACT

A method, apparatus and computer program product are provided in order to provide for periodic measurements related to a frequency identified by the network, such as a downlink frequency associated with a secondary uplink frequency. In the context of a method, a message is caused to be transmitted to a mobile terminal indicating that the mobile terminal is to perform periodic measurements in relation to a secondary uplink frequency. Following the performance of the periodic measurements by the mobile terminal, the method also includes receiving an indication of the periodic measurements in relation to the secondary uplink frequency that have been performed by the mobile terminal.

20 Claims, 4 Drawing Sheets

MEASUREMENT REPORTING

CROSS-REFERENCE TO RELATED APPLICATION

This application is a Continuation of U.S. patent application Ser. No. 13/849,988 filed Mar. 25, 2013, which in turn claims the benefit under 35 U.S.C. §119(a) and 37 CFR §1.55 to UK Patent Application No. GB 1208469.5, filed on May 11, 2012, the entire disclosure of each of which is incorporated herein by reference.

TECHNICAL FIELD

The present disclosure relates to measurement reporting. In particular, but not exclusively, the present disclosure relates to a method, apparatus and computer program product for use in reporting periodic measurements and, more particularly, to the performance of periodic measurements in relation to an uplink frequency.

BACKGROUND

Dual cell-high speed uplink packet access (DC-HSUPA) was introduced in Release 9 of the Third Generation Partnership Project (3GPP) specifications. DC-HSUPA introduced a secondary uplink frequency that a mobile terminal may utilize in order to perform uplink data transmission in addition to the primary uplink frequency. Along with the definition of the DC-HSUPA feature by Release 9 of the 3GPP specifications, event-triggered intra-frequency measurements were introduced for the downlink frequency associated with the secondary uplink frequency. However, the 3GPP specifications have not specified any technique for performing periodic measurements for a specific frequency, such as for the downlink frequency associated with the secondary uplink frequency, and for reporting the results of any such periodic measurements. Instead, the only intra-frequency measurements for the downlink frequency associated with the secondary uplink frequency are event-triggered intra-frequency measurements as opposed to periodic measurements.

TS25.331 of the 3GPP specifications defines an inter-frequency periodic measurement. If the periodic inter-frequency measurements are configured, the mobile terminal shall perform the periodic measurements on the configured inter-frequencies' neighbor cells in the neighbor cell list with the network being able to configure up to two inter-frequencies' neighbor cells in the neighbor cell list. However, these periodic measurements apply not only for a specific single frequency, but for all the configured inter-frequencies to be measured.

SUMMARY

A method, apparatus and computer program product for periodic measurements related to a frequency identified by a network, such as a downlink frequency associated with a secondary uplink frequency. As such, the method, apparatus and computer program product of embodiments provide for periodic measurements of a downlink frequency associated with the secondary uplink frequency to be performed and reported to the network, thereby maintaining a desired set of cells in the active set that are involved in the uplink transmission, such as by adding a new cell in the active set and/or removing a cell from the active set based on, for example, measured results.

In accordance with first embodiments, there is a method for use in measurement reporting, the method including:
causing a message to be transmitted to a mobile terminal indicating that the mobile terminal is to perform periodic measurements in relation to a secondary uplink frequency; and
receiving an indication of the periodic measurements in relation to the secondary uplink frequency performed by the mobile terminal
wherein the message identifies the secondary uplink frequency and includes control information specific to the secondary uplink frequency, independent of any other frequency to be measured.

In accordance with second embodiments, there is apparatus for use in measurement reporting, the apparatus including at least one processor and at least one memory including computer program code, the at least one memory and the computer program code being configured to, with the at least one processor, cause the apparatus at least to:
cause a message to be transmitted to a mobile terminal indicating that the mobile terminal is to perform periodic measurements in relation to a secondary uplink frequency; and
receive an indication of the periodic measurements in relation to the secondary uplink frequency performed by the mobile terminal,
wherein the message identifies the secondary uplink frequency and includes control information specific to the secondary uplink frequency, independent of any other frequency to be measured.

In accordance with third embodiments, there is computer program product including a non-transitory computer-readable storage medium having computer readable instructions stored thereon, the computer readable instructions being executable by a computerized device to cause the computerized device to perform a method for use in measurement reporting, the method including:
causing a message to be transmitted to a mobile terminal indicating that the mobile terminal is to perform periodic measurements in relation to a secondary uplink frequency; and
receiving an indication of the periodic measurements in relation to the secondary uplink frequency performed by the mobile terminal
wherein the message identifies the secondary uplink frequency and includes control information specific to the secondary uplink frequency, independent of any other frequency to be measured.

In accordance with fourth embodiments, there is a method for use in measurement reporting, the method including:
receiving a message indicating that periodic measurements are to be performed periodically in relation to a secondary uplink frequency;
in response to receipt of the message, performing the periodic measurements periodically in relation to the secondary uplink frequency; and
causing an indication of the periodic measurements to be provided to a network,
wherein the received message identifies the secondary uplink frequency and includes control information specific to the secondary uplink frequency, independent of any other frequency to be measured, and
wherein performing the periodic measurements includes performing the periodic measurements in relation to the secondary uplink frequency identified by the message.

In accordance with fifth embodiments, there is apparatus for use in measurement reporting, the apparatus including at least one processor and at least one memory including computer program code, the at least one memory and the computer program code being configured to, with the at least one processor, cause the apparatus at least to:

receive a message indicating that periodic measurements are to be performed periodically in relation to a secondary uplink frequency;

in response to receipt of the message, perform the periodic measurements periodically in relation to the secondary uplink frequency; and cause an indication of the periodic measurements to be provided to a network, wherein the received message identifies the secondary uplink frequency and includes control information specific to the secondary uplink frequency, independent of any other frequency to be measured, and wherein performing the periodic measurements includes performing the periodic measurements in relation to the secondary uplink frequency identified by the message.

In accordance with sixth embodiments, there is a computer program product including a non-transitory computer-readable storage medium having computer readable instructions stored thereon, the computer readable instructions being executable by a computerized device to perform a method for use in measurement reporting, the method including:

receiving a message indicating that periodic measurements are to be performed periodically in relation to a secondary uplink frequency;

in response to receipt of the message, performing the periodic measurements periodically in relation to the secondary uplink frequency; and causing an indication of the periodic measurements to be provided to a network, wherein the received message identifies the secondary uplink frequency and includes control information specific to the secondary uplink frequency, independent of any other frequency to be measured, and wherein performing the periodic measurements includes performing the periodic measurements in relation to the secondary uplink frequency identified by the message.

Further features and advantages will become apparent from the following description of preferred embodiments, given by way of example only, which is made with reference to the accompanying drawings.

DETAILED DESCRIPTION

Embodiments now will be described more fully hereinafter with reference to the accompanying drawings, in which some, but not all embodiments are shown. Indeed, embodiments may be embodied in many different forms and should not be construed as limited to the embodiments set forth herein. Like numbers refer to like elements throughout.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a processing system and/or combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processing system or processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

A method, apparatus, computer software and computer program product are provided according to one embodiment in order to provide for periodic measurements related to a frequency identified by the network, such as a downlink frequency associated with a secondary uplink frequency. In this regard, a network element, such as an access point, may transmit a message to a mobile terminal to instruct the mobile terminal to perform the periodic intra-frequency measurements. The mobile terminal may, in turn, perform the periodic intra-frequency measurements in response to receipt of the message from the network element and may thereafter report the results of the periodic intra-frequency measurements to the network element. By taking into account the periodic measurements related to a frequency identified by the network, such as a downlink frequency associated with a secondary uplink frequency, a desired set of cells that are involved in the uplink transmission may be maintained in the active set, such as by adding a new cell in the active set and/or removing a cell from the active set based on, for example, measured results.

Figure 1:
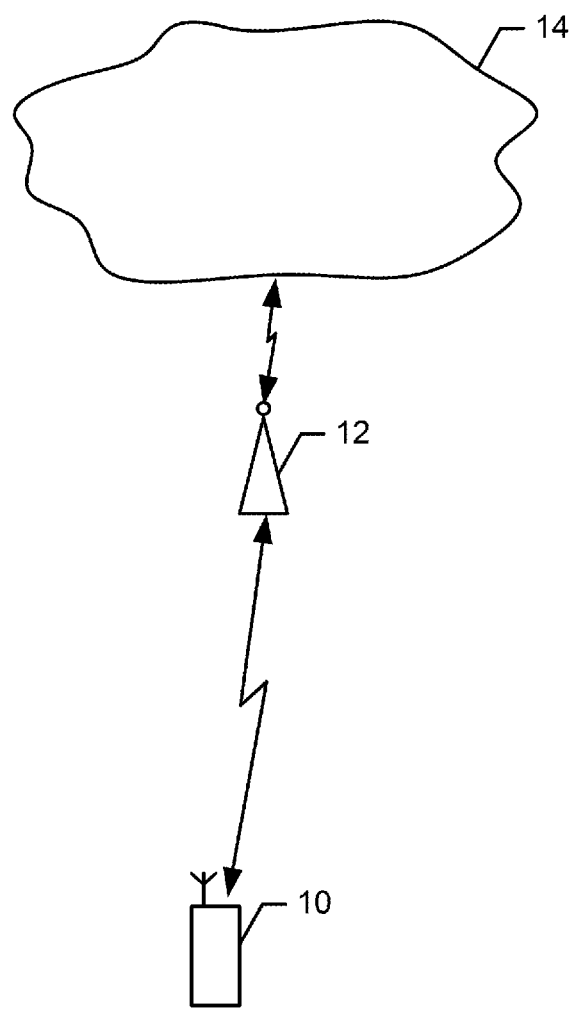
FIG. 1 is a schematic representation of a system that may be specifically configured in accordance with embodiments.

Referring now to FIG. 1, a system that supports communications between a plurality of mobile terminals 10 (one of which is illustrated by way of example) and a network 14, such as an 802.11 network, a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network or other type of network, via an access point 12 is shown. Various types of mobile terminals may be employed including, for example, mobile communication devices such as, for example, mobile telephones, personal digital assistants (PDAs), pagers, computers, e.g., laptop computers, tablet computers, etc., data cards, dongles, e.g., universal serial bus (USB) dongles, or any of numerous other hand-held or portable communication devices, computation devices, content generation devices, content consumption devices, or combinations thereof. The mobile terminal may communicate with the network via an access point, such as a base station, a Node B, an evolved Node B (eNB), a radio network controller (RNC), a relay node or other type of access point.

Figure 2:
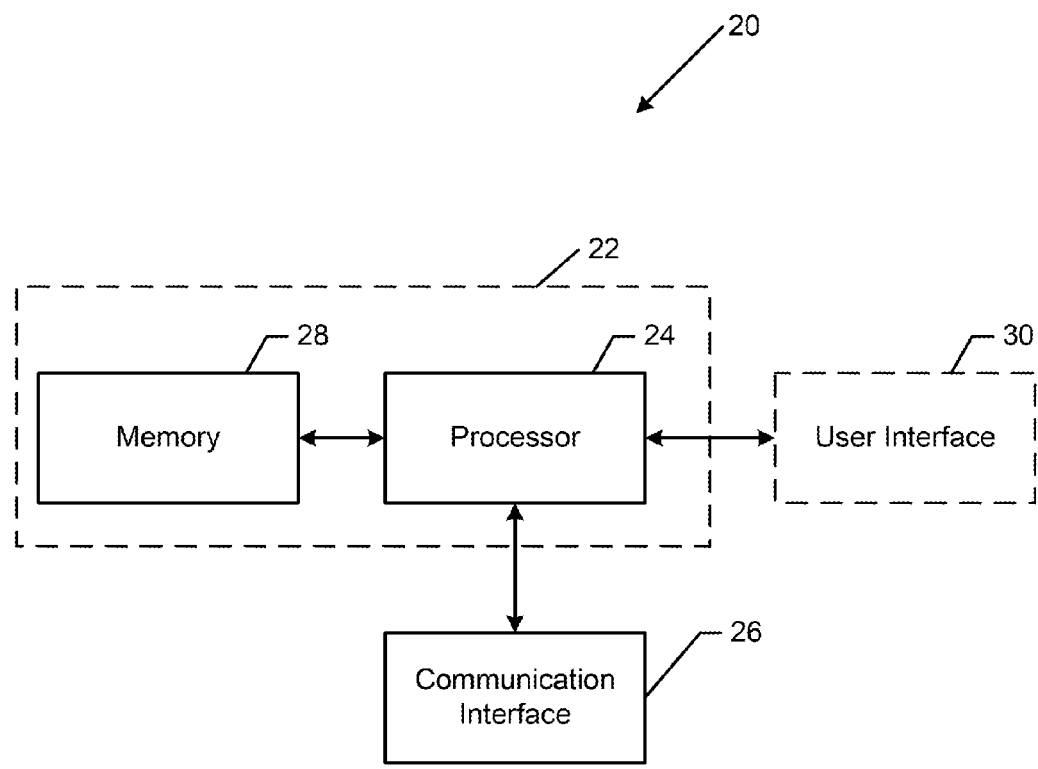
FIG. 2 is a block diagram that may be embodied or otherwise associated with a mobile terminal or a network entity, such as an access point, and that may be specifically configured in accordance with embodiments.

The mobile terminal 10 and the access point 12 may each embody or otherwise be associated with an apparatus 20 that is generally depicted in FIG. 2 and that may be configured to perform various operations in accordance with embodiments as described below, such as in conjunction with FIG. 3 from the perspective of the access point and FIG. 4 from the perspective of the mobile terminal. However, it should be noted that the components, devices or elements described below may not be mandatory and thus some may be omitted in certain embodiments. Additionally, some embodiments may include further or different components, devices or elements beyond those shown and described herein.

As shown in FIG. 2, the apparatus 20 may include or otherwise be in communication with a processing system including, for example, processing circuitry 22 that is configurable to perform actions in accordance with embodiments described herein. The processing circuitry may be configured to perform data processing, application execution and/or other processing and management services according to embodiments. In some embodiments, the apparatus or the processing circuitry may be embodied as a chip or chip set. In other words, the apparatus or the processing circuitry may include one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment on a single chip or as a single "system on a chip." As such, in some cases, a chip or chipset may constitute means for performing one or more operations for providing the functionalities described herein.

In an embodiment, the processing circuitry 22 may include a processor 24 and memory 28 that may be in communication with or otherwise control a communication interface 26 and, in some cases in which the apparatus is embodied by the mobile terminal 10, a user interface 30. As such, the processing circuitry may be embodied as a circuit chip (e.g., an integrated circuit chip) configured (e.g., with hardware, software or a combination of hardware and software) to perform operations described herein.

The user interface 30 (if implemented in embodiments of the apparatus 20 embodied by the mobile terminal 10) may be in communication with the processing circuitry 22 to receive an indication of a user input at the user interface and/or to provide an audible, visual, mechanical or other output to the user. As such, the user interface may include, for example, a keyboard, a mouse, a joystick, a display, a touch screen, a microphone, a speaker, and/or other input/output mechanisms. In one embodiment, the user interface includes user interface circuitry configured to facilitate at least some functions of the mobile terminal by receiving user input and providing output via, for example, a display, a touch screen or the like.

The communication interface 26 may include one or more interface mechanisms for enabling communication with other devices and/or networks. In some cases, the communication interface may be any means such as a device or circuitry embodied in either hardware, or a combination of hardware and software that is configured to receive and/or transmit data from/to a network and/or any other device or module in communication with the processing circuitry 22, such as between the mobile terminal 10 and an access point. In this regard, the communication interface may include, for example, an antenna (or multiple antennas) and supporting hardware and/or software for enabling communications with a wireless communication network and/or a communication modem or other hardware/software for supporting communication via cable, digital subscriber line (DSL), USB, Ethernet or other methods.

In an embodiment, the memory 28 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with embodiments. For example, the memory could be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), a DSP (digital signal processor) or the like. In an embodiment, the processor may be configured to execute instructions stored in the memory 28 or otherwise accessible to the processor. As such, whether configured by hardware or by a combination of hardware and software, the processor may represent an entity (e.g., physically embodied in circuitry—in the form of processing circuitry) capable of performing operations according to embodiments while configured accordingly. Thus, for example, when the processor is embodied as an ASIC, an FPGA, a DSP or the like, the processor may be specifically configured hardware for conducting the operations described herein. Alternatively, as another example, when the processor is embodied as an executor of software instructions, the instructions may specifically configure the processor to perform the operations described herein.

Figure 3:
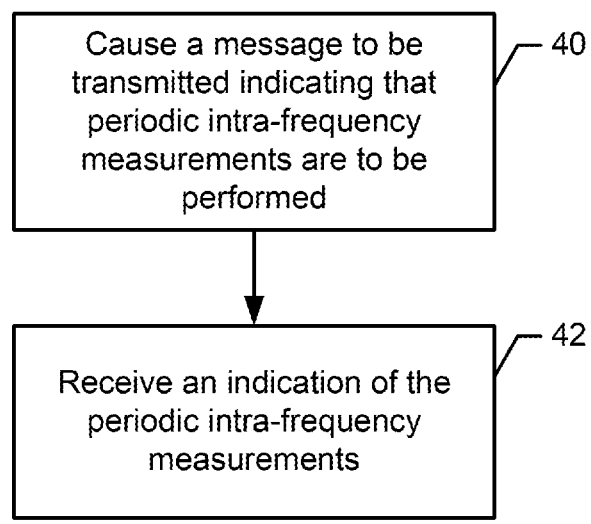
FIG. 3 is a flowchart illustrating the operations performed by an apparatus that may be embodied by or otherwise associated with a network entity, such as an access point, and that may be specifically configured in accordance with embodiments.

Referring now to FIG. 3, the operations performed by a method, apparatus, computer software and computer program product of an example embodiment are illustrated from the perspective of an apparatus 20 that may be embodied by or otherwise associated with a network entity, such as an access point 12. In this regard and as shown in operation 40 of FIG. 3, the apparatus embodied by a network entity, such as the access point, may include means, such as the processing circuitry 22, the processor 24, the communication interface 26 or the like, for causing a message to be transmitted to a mobile terminal 10 indicating that the mobile terminal is to perform periodic intra-frequency measurements in relation to a frequency identified by the message or otherwise identified by the network. Whilst the message may identify a variety of different frequencies for which the mobile terminal is requested to perform periodic intra-frequency measurements, the message that is transmitted by the network entity, such as the access point, in one embodiment, indicates that the mobile terminal is to perform periodic intra-frequency measurements in relation to a secondary uplink frequency, such as a secondary uplink frequency established by DC-HSUPA. As such, the message of this embodiment identifies the secondary uplink frequency.

In one embodiment, the message also includes control information. The control information may include the reporting amount that indicates the number of times that a periodic intra-frequency measurement is to be reported by the mobile terminal 10 to the access point 12. Additionally or alternatively, the control information may include the interval at which the results of the periodic intra-frequency measurements are to be reported to the network. Based on the control information, the mobile terminal 10 may then perform the periodic intra-frequency measurements, such as periodic intra-frequency measurements in relation to a secondary uplink frequency, and may report the results in accordance with the control information provided via the message as described below. In this regard, the combination of the reporting amount and the interval define the measurement period in which a periodic intra-frequency measurement is reported with the measurement period equaling, for example, the product of the reporting amount and the interval. In one embodiment, the control information may additionally or alternatively include the reporting cell status that indicates the cell group indicating cells that should be measured and reported and/or the maximum number of cells that may be reported in a measurement report message.

In an example useful for explaining embodiments, the message that is transmitted by the network entity, such as the access point 12, to the mobile terminal 10 may include a flag indicating that the mobile terminal is to perform the periodic intra-frequency measurements in relation to the secondary uplink frequency. In this example, the mobile terminal may be able to determine independently the secondary uplink frequency and, in some other examples, the reporting amount that indicates the number of times that a periodic intra-frequency measurement is to be reported and the interval at which the results of the periodic intra-frequency measurements are to be reported, such as based upon predefined control information stored by or otherwise accessible by the mobile terminal. As such, the message of this example may include a flag that may be set to a first value in order to indicate that the periodic intra-frequency measurements are to be performed by the mobile terminal in accordance with the control information that has already been provided to or is otherwise accessible by the mobile terminal. Conversely, the message of this example may include a flag set to a second value, different from the first value, to indicate that the mobile terminal need not perform the periodic intra-frequency measurements.

As indicated by operation 42 of FIG. 3, the apparatus 20 embodied by the network entity, such as an access point 12, may also include means, such as the processing circuitry 22, the processor 24, the communication interface 26 or the like, for receiving an indication of the periodic intra-frequency measurements that have been performed by the mobile terminal 10. For example, the periodic intra-frequency measurements may be the periodic intra-frequency measurements performed by the mobile terminal in relation to the secondary uplink frequency or another frequency specified by the message transmitted from the access point.

In an embodiment in which the mobile terminal 10 performs periodic intra-frequency measurements in relation to a secondary uplink frequency, the indication of the periodic intra-frequency measurements that is received by the network entity, such as the access point 12, may include the measured results, such as an indication of a quality, e.g., Ec/No, of a cell on a downlink frequency associated with the secondary uplink frequency, an indication of the strength of signals on the downlink frequency associated with the secondary uplink frequency and/or an indication of pathloss. For example, the measured results may include received signal code power (RSCP), which is a measure of both the strength of the signals and the quality of the signals. As such, a desired set of cells that is involved in the uplink transmission may be maintained in the active set, such as by adding a new cell in the active set and/or removing a cell from the active set based on, for example, measured results.

From the perspective of an apparatus 20 embodied by the mobile terminal 10, the apparatus may include means, such as the processing circuitry 22, the processor 24, the communication interface 26 or the like, for receiving a message indicating that periodic intra-frequency measurements are to be performed periodically. See operation 50 of FIG. 4. As described above, this message may be received by the mobile terminal from the network entity, such as an access point 12. The message may indicate the frequency for which the mobile terminal is to perform the periodic intra-frequency measurements. In one embodiment, the message may indicate that periodic intra-frequency measurements are to be performed periodically in relation to a secondary uplink frequency, such as a secondary uplink frequency as defined by DC-HSUPA. As such, the message provided by the network entity, such as an access point 12, in this embodiment indicates the secondary uplink frequency for which the mobile terminal is to perform the periodic intra-frequency measurements.

The message received by the mobile terminal 10 includes control information. In one embodiment, the control information includes the reporting amount that indicates the number of times that a periodic intra-frequency measurement is to be reported. Additionally, or alternatively, the control information may include the interval at which results of the intra-frequency measurements are to be reported to the network, such as to the access point 12. In this regard, the combination of the reporting amount and the interval define the measurement period in which a periodic intra-frequency measurement is reported with the measurement period equaling, for example, the product of the reporting amount and the interval. In one embodiment, the control information may additionally or alternatively include the reporting cell status that indicates the cell group indicating cells that should be measured and reported and/or the maximum number of cells that may be reported in a measurement report message.

In an example useful for explaining embodiments, the message that is received by the mobile terminal 10 may include a flag indicating that periodic intra-frequency measurements are to be performed, such as in relation to the secondary uplink frequency. As indicated above, in this example, the mobile terminal may be able to determine independently the secondary uplink frequency and, in some other examples, the reporting amount that indicates the number of times that a periodic intra-frequency measurement is to be reported and the interval at which the results of the periodic intra-frequency measurements are to be reported, such as based upon predefined control information stored by the memory 28 or otherwise accessible by the mobile terminal. As such, the message of this example may include a flag that may be set to a first value in order to indicate that the periodic intra-frequency measurements are to be performed by the mobile terminal in accordance with the control information that has already been provided to or is otherwise accessible by the mobile terminal. Conversely, the message of this example may include a flag that may be set to a second value, different from the first value, to indicate that the mobile terminal need not perform the periodic intra-frequency measurements.

Figure 4:
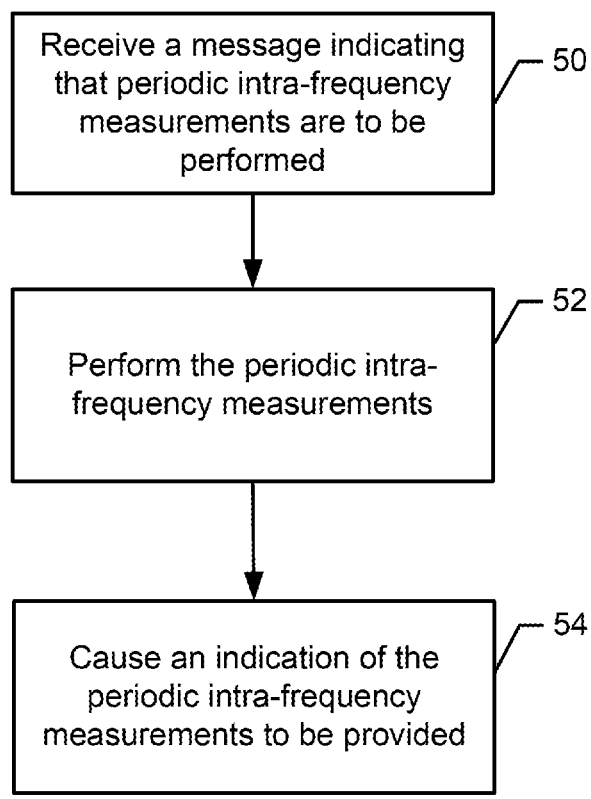
FIG. 4 is a flowchart illustrating the operations performed by an apparatus that may be embodied by or otherwise associated with a mobile terminal and that may be specifically configured in accordance with embodiments.

As shown in operation 52 of FIG. 4, the apparatus 20 embodied by the mobile terminal 10 may also include means, such as the processing circuitry 22, the processor 24 or the like, for performing, in response to receipt of the message, the periodic intra-frequency measurements. In this regard, the apparatus, such as the processing circuitry, the processor or the like, may perform the periodic intra-frequency measurements periodically in relation to a frequency that is identified by the message provided by the network entity, such as the access point 12. In one embodiment, the apparatus embodied by the mobile terminal may perform the periodic intra-frequency measurements periodically in relation to the secondary uplink frequency, such as the secondary uplink frequency identified by the message.

In one embodiment in which the message also includes control information that identifies the reporting amount that indicates the number of times that a periodic intra-frequency measurement is to be reported, the apparatus 20 embodied by the mobile terminal 10 may also include the means, such as the processing circuitry 22, the processor 24 or the like, for causing the periodic intra-frequency measurements to be reported the indicated number of times.

The apparatus 20 embodied by the mobile terminal 10 may perform various types of periodic intra-frequency measurements. In one embodiment, however, the apparatus embodied by the mobile terminal may include means, such as the processing circuitry 22, the processor 24 or the like, for determining at least one of a quality, e.g., Ec/No, of a cell on a downlink frequency associated with the secondary uplink frequency, a strength of the signals on the secondary uplink frequency and/or an indication of pathloss. For example, the measured results may include received signal code power (RSCP), which is a measure of both the strength of the signals and the quality of the signals.

In an embodiment in which the message includes a flag indicating that periodic intra-frequency measurements are to be performed, such as in relation to the secondary uplink frequency, the apparatus 20 embodied by the mobile terminal 10 may include means, such as the processing circuitry 22, the processor 24 or the like, for performing the periodic intra-frequency measurements in response to the flag indicating that the periodic intra-frequency measurements are to be performed.

Referring now to operation 54 of FIG. 4, the apparatus 20 embodied by the mobile terminal 10 may also include means, such as the processing circuitry 22, the processor 24, the communication interface 26 or the like, for causing an indication of the periodic intra-frequency measurements to be provided to a network, such as to the network entity, e.g., an access point 12. The indication of the periodic intra-frequency measurements may be provided in various manners, but, in one embodiment, in which the control information provided via the message that is transmitted by the network entity, such as the access point, includes a reporting interval at which the results of the intra-frequency measurements are to be reported, the apparatus, such as the processing circuitry, the processor, the communication interface or the like, may cause the indication of the periodic intra-frequency measurements to be provided in accordance with the interval included within the control information.

The indication of periodic intra-frequency measurements as provided by the mobile terminal 10 may include a variety of different types of information depending upon the periodic intra-frequency measurements that are performed. In one embodiment, however, the indication of the periodic intra-frequency measurements that is provided may include the measured results, such an indication of the quality, Ec/No, of the cell on a downlink frequency associated with the secondary uplink frequency, an indication of the strength of the signals on the secondary uplink frequency and/or an indication of pathloss. For example, the measured results may include received signal code power (RSCP), which is a measure of both the strength of the signals and the quality of the signals. As such, a desired set of cells that are involved in the uplink transmission may be maintained in the active set, such as by adding a new cell in the active set and/or removing a cell from the active set based on, for example, measured results. Since the performance of the secondary uplink frequency may change over time due to various conditions, the periodic intra-frequency measurements and the reporting of the results of the periodic intra-frequency measurements from the mobile terminal to the network entity, such as the access point, permits the network, such as the access point, to obtain updated measured results and to modify the active set based upon the updated measurements.

As noted above, FIGS. 3 and 4 are flowcharts illustrating the operations performed by a method, apparatus, computer software and computer program product, such as apparatus 20 of FIG. 2, from the perspective of an access point 12 and a mobile terminal 10, respectively, in accordance with one embodiment. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 28 of an apparatus employing an embodiment and executed by a processor 24 of the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. As such, the operations of FIGS. 3 and 4, when executed, convert a computer or processing circuitry into a particular machine configured to perform embodiments. Accordingly, the operations of FIGS. 3 and 4 define an algorithm for configuring a computer or processing circuitry, e.g., processor, to perform an example embodiment. In some cases, a general purpose computer may be provided with an instance of the processor which performs the algorithm of FIGS. 3 and 4 to transform the general purpose computer into a particular machine configured to perform embodiments.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Moreover, in some embodiments additional optional operations may also be included. It should be appreciated that each of the modifications, optional additions or amplifications may be included with the operations above either alone or in combination with any others among the features described herein.

In accordance with embodiments, there is a method for use in measurement reporting, the method including:

causing a message to be transmitted to a mobile terminal indicating that the mobile terminal is to perform periodic measurements in relation to a frequency identified by the message; and receiving an indication of the periodic measurements performed by the mobile terminal in relation to the frequency identified by the message.

In accordance with embodiments, there is a method, apparatus and computer program product for use in measurement reporting. The method includes:

receiving a message indicating that periodic measurements are to be performed periodically in relation to a frequency indicated by the message;

in response to receipt of the message, performing the periodic measurements periodically in relation to the frequency indicated by the message; and causing an indication of the periodic measurements to be provided to a network.

In accordance with embodiments, there is a computer program product including a non-transitory computer-readable storage medium having computer readable instructions stored thereon, the computer readable instructions being executable by a computerized device to cause the computerized device to perform a method for use in measurement reporting, the method including:

causing a message to be transmitted to a mobile terminal indicating that the mobile terminal is to perform periodic measurements in relation to a secondary uplink frequency; and receiving an indication of the periodic measurements in relation to the secondary uplink frequency performed by the mobile terminal.

In accordance with embodiments, there is a computer program product including a non-transitory computer-readable storage medium having computer readable instructions stored thereon, the computer readable instructions being executable by a computerized device to cause the computerized device to perform a method for use in measurement reporting, the method including:

receiving a message indicating that periodic measurements are to be performed periodically in relation to a secondary uplink frequency;

in response to receipt of the message, performing the periodic measurements periodically in relation to the secondary uplink frequency; and causing an indication of the periodic measurements to be provided to a network.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method for use in measurement reporting, the method comprising:

causing a message to be transmitted to a mobile terminal indicating that the mobile terminal is to perform periodic measurements in relation to a secondary uplink frequency;

receiving, from the mobile terminal, a report regarding the periodic measurements performed by the mobile terminal in relation to the secondary uplink frequency, and maintaining, based on the periodic measurements, a set of one or more cells associated with an uplink transmission at the secondary uplink frequency, including adding a cell to the set of one or more cells or removing a cell from the set of one or more cells based at least in part on the periodic measurements, wherein the message identifies the secondary uplink frequency and includes control information specific to the secondary uplink frequency, independent of any other frequency to be measured.

2. The method according to claim 1, wherein the control information includes at least one of:

a reporting amount that indicates a number of times that a periodic measurement is to be reported, an interval at which results of the periodic measurements are to be reported, and a reporting cell status.

3. The method according to claim 1, wherein the message includes a flag indicating that the mobile terminal is to perform the periodic measurements in relation to the secondary uplink frequency.

4. The method according to claim 1, wherein receiving the report regarding the periodic measurements comprises receiving at least one of:

an indication of a quality of a cell on a downlink frequency associated with the secondary uplink frequency, an indication of a strength of signals on the downlink frequency associated with the secondary uplink frequency, and a pathloss.

5. An apparatus for use in measurement reporting, the apparatus comprising at least one processor and at least one memory including computer program code, the at least one memory and the computer program code being configured to, with the at least one processor, cause the apparatus at least to:

cause a message to be transmitted to a mobile terminal indicating that the mobile terminal is to perform periodic measurements in relation to a secondary uplink frequency;

receive, from the mobile terminal, a report regarding the periodic measurements performed by the mobile terminal in relation to the secondary uplink frequency, and maintain, based on the periodic measurements, a set of one or more cells associated with an uplink transmission at the secondary uplink frequency, including adding a cell to the set of one or more cells or removing a cell from the set of one or more cells based at least in part on the periodic measurements, wherein the message identifies the secondary uplink frequency and includes control information specific to the secondary uplink frequency, independent of any other frequency to be measured.

6. The apparatus according to claim 5, wherein the control information includes at least one of:
   a reporting amount that indicates a number of times that a periodic measurement is to be reported,
   an interval at which results of the periodic measurements are to be reported, and
   a reporting cell status.

7. The apparatus according to claim 5, wherein at least one of:
   the message includes a flag indicating that the mobile terminal is to perform the periodic measurements in relation to the secondary uplink frequency; and
   wherein the apparatus is embodied by a radio network controller.

8. The apparatus according to claim 5, wherein the at least one processor is configured to cause the apparatus to receive the report regarding the periodic measurements by receiving at least one of:
   an indication of a quality of a cell on a downlink frequency associated with the secondary uplink frequency,
   an indication of a strength of signals on the secondary uplink frequency, and
   a pathloss.

9. A computer program product comprising a non-transitory computer readable storage medium having computer readable Instructions stored thereon, the computer readable instructions being executable by a computerized device to cause the computerized device to perform a method for use in measurement reporting, the method comprising:
   causing a message to be transmitted to a mobile terminal indicating that the mobile terminal is to perform periodic measurements in relation to a secondary uplink frequency;
   receiving, from the mobile terminal, a report regarding the periodic measurements performed by the mobile terminal in relation to the secondary uplink frequency, and
   maintaining, based on the periodic measurements, a set of one or more cells associated with an uplink transmission at the secondary uplink frequency, including adding a cell to the set of one or more cells or removing a cell from the set of one or more cells based at least in part on the periodic measurements,
   wherein the message identifies the secondary uplink frequency and includes control information specific to the secondary uplink frequency, independent of any other frequency to be measured.

10. A method for use in measurement reporting, the method comprising:
    receiving a message indicating that periodic measurements are to be performed periodically in relation to a secondary uplink frequency;
    in response to receipt of the message, performing the periodic measurements periodically in relation to the secondary uplink frequency;
    causing a report regarding the periodic measurements to be provided from a mobile terminal to a network, and
    maintaining, based on the periodic measurements, a set of one or more cells associated with an uplink transmission at the secondary uplink frequency, including adding a cell to the set of one or more cells or removing a cell from the set of one or more cells based at least in part on the periodic measurements,
    wherein the received message identifies the secondary uplink frequency and includes control information specific to the secondary uplink frequency, independent of any other frequency to be measured, and
    wherein performing the periodic measurements comprises performing the periodic measurements in relation to the secondary uplink frequency identified by the message.

11. The method according to claim 10, wherein the control information includes at least one of:
    a reporting amount that indicates a number of times that a periodic measurement is to be reported,
    an interval at which results of the measurements are to be reported, and
    a reporting cell status.

12. The method according to claim 10, wherein causing the report regarding the periodic measurements to be provided comprises at least one of:
    causing a periodic measurement to be reported a number of times indicated by the reporting amount included within the control information; and
    causing the report regarding the periodic measurements to be provided in accordance with the interval included within the control information.

13. The method according to claim 10, wherein performing the periodic measurements comprises determining at least one of:
    a quality of a cell on a downlink frequency associated with the secondary uplink frequency,
    an indication of a strength of signals on the secondary uplink frequency, and
    a pathloss.

14. The method according to claim 10, wherein the received message includes a flag indicating that periodic measurements are to be performed in relation to the secondary uplink frequency.

15. An apparatus for use in measurement reporting, the apparatus comprising at least one processor and at least one memory including computer program code, the at least one memory and the computer program code being configured to, with the at least one processor, cause the apparatus at least to:
    receive a message indicating that periodic measurements are to be performed periodically in relation to a secondary uplink frequency;
    in response to receipt of the message, perform the periodic measurements periodically in relation to the secondary uplink frequency;
    cause a report regarding the periodic measurements to be provided from a mobile terminal to a network, and
    maintain, based on the periodic measurements, a set of one or more cells associated with an uplink transmission at the secondary uplink frequency, including adding a cell to the set of one or more cells or removing a cell from the set of one or more cells based at least in part on the periodic measurements,
    wherein the received message identifies the secondary uplink frequency and includes control information specific to the secondary uplink frequency, independent of any other frequency to be measured, and
    wherein performing the periodic measurements comprises performing the periodic measurements in relation to the secondary uplink frequency identified by the message.

16. The apparatus according to claim 15, wherein the control information includes at least one of:
    a reporting amount that indicates a number of times that a periodic measurement is to be reported,
    an interval at which results of the periodic measurements are to be reported, and
    a reporting cell status.

17. The apparatus according to claim 15, wherein the at least one processor is configured to cause the apparatus to at least one of:
    cause an indication of the periodic measurements to be provided by causing a periodic measurement to be reported a number of times indicated by the reporting amount included within the control information;

cause an indication of the periodic measurements to be provided by causing the indication of the periodic measurements to be provided in accordance with the interval included within the control information; and perform the periodic measurements by determining at least one of:
a quality of a cell on a downlink frequency associated with the secondary uplink frequency,
an indication of a strength of signals on the secondary uplink frequency, and
a pathloss.

18. The apparatus according to claim 15, wherein at least one of:
the received message includes a flag indicating that periodic measurements are to be performed in relation to the secondary uplink frequency; and
the apparatus is embodied by a mobile telephone.

19. The apparatus according to claim 18, further comprising user interface circuitry adapted to facilitate user control of at least some functions of the mobile telephone through use of a display or a touch screen.

20. A computer program product comprising a non-transitory computer readable storage medium having computer readable instructions stored thereon, the computer readable instructions being executable by a computerized device to cause the computerized device to perform a method for use in measurement reporting, the method comprising:

receiving a message indicating that periodic measurements are to be performed periodically In relation to a secondary uplink frequency;

in response to receipt of the message, performing the periodic measurements periodically in relation to the secondary uplink frequency;

causing a report regarding the periodic measurements to be provided from a mobile terminal to a network, and maintaining, based on the periodic measurements, a set of one or more cells associated with an uplink transmission at the secondary uplink frequency, comprising adding a cell to the set of one or more cells or removing a cell from the set of one or more cells based at least in part on the periodic measurements, wherein the received message identifies the secondary uplink frequency and includes control information specific to the secondary uplink frequency, independent of any other frequency to be measured, and wherein performing the periodic measurements comprises performing the periodic measurements in relation to the secondary uplink frequency identified by the message.

* * * * *